US007286474B2

(12) United States Patent
Garg et al.

(10) Patent No.: US 7,286,474 B2
(45) Date of Patent: Oct. 23, 2007

(54) METHOD AND APPARATUS FOR PERFORMING ADMISSION CONTROL IN A COMMUNICATION NETWORK

(75) Inventors: Sachin Garg, Green Brook, NJ (US); Martin Kappes, Bridgewater, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 1124 days.

(21) Appl. No.: 10/261,243

(22) Filed: Sep. 30, 2002

(65) Prior Publication Data
US 2004/0008627 A1 Jan. 15, 2004

Related U.S. Application Data

(60) Provisional application No. 60/395,445, filed on Jul. 12, 2002.

(51) Int. Cl.
*H04L 12/26* (2006.01)
(52) U.S. Cl. .................................. 370/230; 370/232
(58) Field of Classification Search ................ 370/230, 370/230.1, 231, 232
See application file for complete search history.

(56) References Cited

U.S. PATENT DOCUMENTS 6,738,819 B1 * 5/2004 Li et al. ..................... 709/229

2003/0235209 A1 * 12/2003 Garg et al. ................. 370/468
2005/0059417 A1 * 3/2005 Zhang et al. ............... 455/515

OTHER PUBLICATIONS

Sachin Garg et al., 'A New Admission Control Metric for VoIP Traffic in 802.11 Networks', IEEE Wireless Communications and Networking Conference WCNC, 2003, pp. 1-16.*
Chhaya et al., "Performance Modeling of Asynchronous Data Transfer Methods of IEEE 802.11 MAC Protocol," Wireless Networks, vol. 3, J. C. Beltzer AG, Science Publishers (1997), 217-234.

(Continued)

*Primary Examiner*—Melvin Marcelo
(74) *Attorney, Agent, or Firm*—Ryan, Mason & Lewis, LLP

(57) ABSTRACT

A method and apparatus are disclosed for assessing the available resources in a network and using the assessment for admission control. A VoIP call can be established with a device only if the network has sufficient resources to accommodate the call or it is possible to make such resources available by curtailing ongoing data connections. A network utilization characteristic (NUC) provides a measure of network capacity. The network utilization characteristic of a flow is the fraction of time the network is busy transmitting data for that flow. The sum of the network utilization characteristics of all flows yields the fraction of time the network is busy transmitting data. The difference between one and the sum of all flows indicates the time that the network is idle in the measured time interval. A new flow can be accommodated if the NUC of the new flow is smaller than this difference value.

20 Claims, 3 Drawing Sheets

OTHER PUBLICATIONS

Anastasi et al., "QoS Provided by the IEEE 802.11 Wireless LAN to Advanced Data Applications: a Simulation Analysis," Wireless Networks, vol. 6, J. C. Beltzer AG, Science Publishers, (2000), 99-108.

G. Bianchi, "Performance Analysis of the IEEE 802.11 Distributed Coordination Function," IEEE Journal on Selected Areas in Communication, vol. 18, No. 3, (Mar. 2000), 535-547.

Garg et al., "Wireless Access Server for Quality of Service and Location Based Access Control in 802.11 Networks," Proceedings of the Seventh IEEE Symposium on Computers and Communication (ISCC'02), (2002).

Garg et al., "Can I Add a VoIP Call?," Proceedings of the IEEE International Conference on Communications (ICC) (2003).

* cited by examiner

METHOD AND APPARATUS FOR PERFORMING ADMISSION CONTROL IN A COMMUNICATION NETWORK

CROSS REFERENCE TO RELATED APPLICATIONS

This application claims the benefit of U.S. Provisional Application No. 60/395,445, filed Jul. 12, 2002.

FIELD OF THE INVENTION

The present invention relates to admission control techniques, and more particularly, to admission control techniques for voice and data traffic in communication networks, such as communication networks based on the IEEE 802.11b standard.

BACKGROUND OF THE INVENTION

Wireless networks based on the IEEE 802.11b standard are increasingly deployed in corporate enterprises and public hot spots, such as airports, hotels and conference facilities. Generally, wireless networks based on the IEEE 802.11b standard are used primarily to provide wireless data access from portable computing devices, such as portable computers and personal digital assistants (PDAs), to a wired network, such as an enterprise network or the Internet. Increasingly, wireless networks based on the IEEE 802.11b standard are being used to carry voice traffic, typically referred to as "voice over IP" (VoIP) traffic.

The IEEE 802.11b standard has a large fixed overhead. Thus, the bandwidth available at the payload sizes typical for VoIP traffic is far less than the bandwidth available when using the network for data traffic. The 802.11b standard currently supports data rates of 1, 2, 5.5 and 11 Mbps. When sending data frames with the maximal data rate of 11 Mbps in such an IEEE 802.11b network, the maximal achievable throughput is approximately 6.2 Mbps. When sending frames for VoIP traffic, however, the maximal achievable throughput is only approximately 2 Mbps, for a typical audio payload size for a packet in a Real Time Protocol (RTP) audio stream.

The significant difference between the achievable throughputs for audio traffic and VoIP traffic is primarily due to the large transmission overhead per frame, regardless of the frame size. Depending on the actual average transmission rate, the number of simultaneous VoIP calls in a cell (the term "cell" is used to refer to the Basic Service Set (BSS) using terminology of the 802.11 standard) of the wireless network is between 4 and 17 calls for an exemplary G711 codec with 30 milliseconds of audio data per packet.

If a wireless network based on the IEEE 802.11b standard accepts one additional call or one additional data connection that exceeds the capacity of the wireless network, an unacceptable call quality for all ongoing VoIP calls results. Furthermore, if the load offered to the network is higher than the capacity of the network, the Distributed Coordination Function (DCF) medium access scheme of the IEEE 802.11b standard curtails the client with the highest load first. In most cases, the access point of the wireless cell provides more traffic to the network than the associated stations. Hence, the access point gets curtailed first which leads to unacceptable packet loss for all VoIP streams transmitted from the access point to a client resulting in poor call quality for all connections. Thus, a need exists for a technique for measuring network capacity and for providing admission control in a wireless network carrying VoIP traffic.

SUMMARY OF THE INVENTION

Generally, a method and apparatus are disclosed for assessing the available resources in a network and to thereafter use the assessment for admission control. The disclosed admission control techniques allows a VoIP call to be established to or from a device only if the network has sufficient resources to accommodate the call or it is possible to make such resources available by curtailing ongoing data connections. A network utilization characteristic (NUC) is measured on a per-flow basis to measure network capacity.

The network utilization characteristic of a flow is defined as the fraction of time the network is busy transmitting data for that flow. Two flows having the same network utilization characteristic are said to be bandwidth equivalent. The sum of the network utilization characteristics of all flows (including auxiliary flows) in the network yields the fraction of time the network is busy transmitting the data for all flows and is referred to herein as NUCTotal. If the medium is constantly busy transmitting data of the flows, then NUCTotal equals one. Consequently, the difference between one and the sum of all flows (NUCTotal) indicates the time that the network is idle in the measured time interval. Generally, a new flow can be accommodated without sacrificing the quality of other flows if the NUC of the new flow is smaller than this difference value.

A disclosed admission control process (i) classifies traffic into flows; (ii) categorizes and measures the network utilization characteristics of each flow; (iii) controls the network usage of each flow to the desired value in accordance with the quality of service (QoS) requirements for all flows; and (iv) enforces admission control based on the predicted network utilization characteristic of the new flow and the current network utilization characteristic of all flows. Once a new flow is detected, the admission control process computes the current NUCs for all existing flows (NUCTotal), and estimates the NUC for the new flow. Generally, if NUCTotal plus the NUC for the new flow is less than a predefined upper limit, NUCTotalMax, then the new flow will be admitted. If NUCTotal plus the NUC for the new flow is not less than the predefined upper limit, it is determined whether other flows are to be curtailed for the new flow, based on the established policies for the network, or whether the new flow should be rejected. If NUCTotal plus the NUC for the new flow is less than the predefined upper limit, then the flow restrictions are calculated and enforced and the new flow is admitted.

Theoretically, the predefined upper limit, NUCTotalMax, can be set to one. According to another aspect of the invention, the predefined upper limit, NUCTotalMax, may be used to (i) account for certain inaccuracies that might arise if data needed to determine the NUC of flows and auxiliary flows is only partially collected, or (ii) create a network capacity backup that might be needed in some situations (or both).

A more complete understanding of the present invention, as well as further features and advantages of the present invention, will be obtained by reference to the following detailed description and drawings.

DETAILED DESCRIPTION

Figure 1:
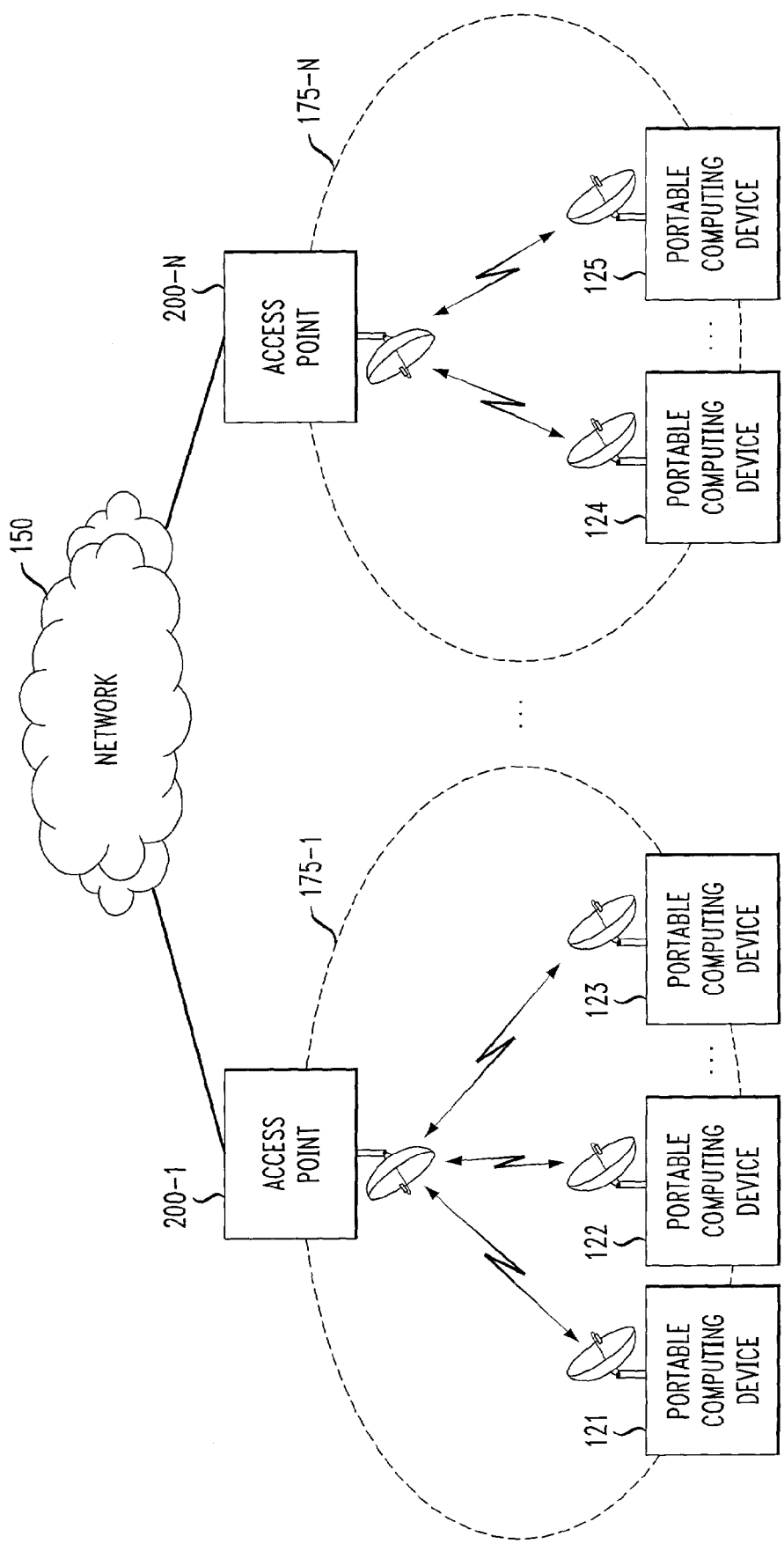
FIG. 1 illustrates a network environment in which the present invention can operate.
Figure 2:
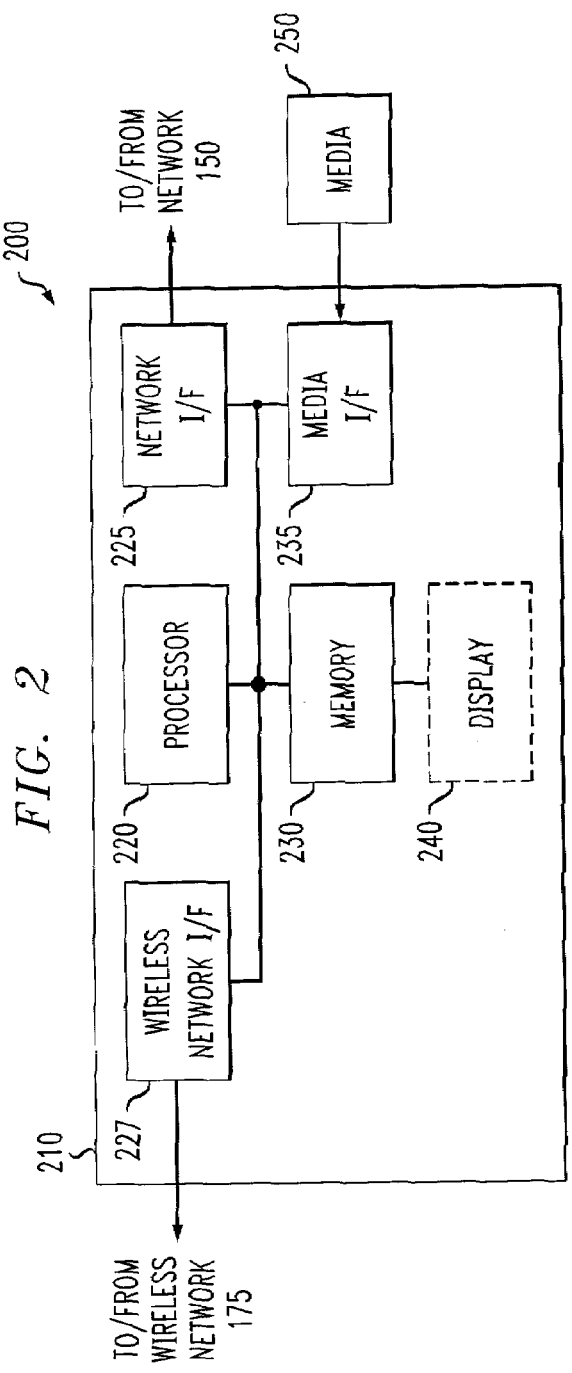
FIG. 2 is a block diagram illustrating an exemplary embodiment of an access point of FIG. 1.

FIG. 1 illustrates a network environment 100 in which the present invention can operate. As shown in FIG. 1, one or more access points 200-1 through 200-N, discussed below in conjunction with FIG. 2, provides wireless data access from one or more portable computing devices 121-125, such as portable computers and personal digital assistants (PDAs), to a network 150, such as an enterprise network, a public telephone network or the Internet (or a combination of the foregoing). The portable computing devices 121-125 generate data or voice traffic (or both). The network 150 can include wired and wireless components. Each access point 200-n defines a corresponding wireless network 175-n, as shown in FIG. 1. The access point 200 is thus often referred to as a wireless gateway.

According to one aspect of the invention, the access point 200 employs a network utilization characteristic (NUC) to assess the available resources in the wireless network 175-n and to thereafter use the NUC assessment for admission control. The present invention allows a VoIP call to be established to or from a portable computing device 121-125 only if the network 175-n has sufficient resources to accommodate the call or it is possible to make such resources available by curtailing ongoing data connections.

FIG. 2 is a block diagram illustrating an exemplary access point 200. As shown in FIG. 2, the access point 200 comprises a computer system 210 that optionally interacts with a Digital Versatile Disk (DVD) 250. Computer system 210 comprises a processor 220, a network interface 225, a wireless network interface 227, a memory 230, a media interface 235, and an optional display 240. Network interface 225 allows computer system 210 to connect to network 150, wireless network interface 227 allows computer system 210 to connect to a wireless network 175, while media interfaces 235 allows computer system 235 to interact with media such as a hard drive or DVD 250.

As is known in the art, the methods and apparatus discussed herein may be distributed as an article of manufacture that itself comprises a computer-readable medium having computer-readable code means embodied thereon. The computer-readable program code means is operable, in conjunction with a computer system such as computer system 210, to carry out all or some of the steps to perform the methods or create the apparatuses discussed herein. The computer-readable medium may be a recordable medium (e.g., floppy disks, hard drives, optical disks such as DVD 250, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk, such as DVD 250.

Memory 230 configures the processor 220 to implement the methods, steps, and functions disclosed herein. The memory 230 could be distributed or local and the processor 220 could be distributed or singular. The memory 230 could be implemented as an electrical, magnetic or optical memory, or any combination of these or other types of storage devices. Moreover, the term "memory" should be construed broadly enough to encompass any information able to be read from or written to an address in the addressable space accessed by processor 210. With this definition, information on a network, accessible through network interface 225 or 227, is still within memory 230 because the processor 220 can retrieve the information from the network. It should be noted that each distributed processor that makes up processor 220 generally contains its own addressable memory space. It should also be noted that some or all of computer system 210 could be incorporated into an application-specific or general-use integrated circuit.

Optional video display 240 is any type of video display suitable for interacting with a human user of system 200. Generally, video display 240 is a computer monitor or other similar video display.

As discussed further below in conjunction with FIG. 3, the access point 200 performs an admission control process 400 that includes the following tasks: (i) classifying traffic into flows at some granularity; (ii) categorizing and measuring the network utilization characteristics of each flow; (iii) controlling the network usage of each flow to the desired value in accordance with the quality of service (QoS) requirements for all flows; and (iv) enforcing admission control based on the predicted network utilization characteristic of the new flow and the current network utilization characteristic of all flows.

It is noted that while the admission control process 400 is illustrated as being performed by the access point 200, the admission control process 400 may alternatively be performed by a switch that connect the access point 200 to the network 150 or some device between the access point 200 and the switch. In addition, the functionality may be split among a number of such devices. In addition, while the present invention is illustrated in the context of a wireless network, the present invention applies to both wired and wireless networks. Finally, while the present invention is focused on the use of NUCs for admission control for VoIP in wireless networks, the actual policies for enforcing such admission control are not within the scope of the invention.

Flows

The access point 200 partitions the traffic into flows. Each transmitted frame belongs to exactly one flow. The criterion could be frame/packet identifiers at various network layers starting from the MAC Layer (Layer 2) up to the Transport Layer (Layer 4). A frame is classified based on a lower layer criteria only if the higher layer information is unavailable indicating that the packet/frame belongs to a specific layer. For example, Internet Control Message Protocol (ICMP) packets are Layer-3 packets. Furthermore, certain frames such as Beacon, probe-request and response frames are limited only to Layer-2. Generally, higher layer criteria, if possible, provides finer granularity of classification.

A Transport Layer flow is uniquely determined by the four-tuple (sourceIP, dstIP, srcPort, dstPort) and by the Transport Layer protocol type of the flow, namely, Transmission Control Protocol (TCP) or the User Datagram Protocol (UDP). Given two communicating stations, this classification scheme implies that the network utilization is measured separately for each traffic direction. A TCP connection results in two TCP flows and a VoIP call consists of two UDP flows. In other words, this separation captures the asymmetric nature of most data connections, such as file/web downloads in terms of network utilization. Apart from flows associated with voice and data traffic, auxiliary flows are also considered. Auxiliary flows represent network activities such as erroneous transmissions and collisions that cannot be accredited to any particular flow but typically represent wasted network capacity.

VoIP Flows and Data Flows

Although the admission control scheme of the present invention could be extended to address other flow categories, the exemplary embodiment described herein considers two classes of flows, namely VoIP flows and data flows.

VoIP traffic flows consist of real-time audio data. Such flows typically use connection-less transport layer protocols, such as the UDP protocol, that do not guarantee the delivery of transmitted audio data information (i.e., lost packets are not retransmitted). Furthermore, the amount of traffic that the sender is transmitting to the receiver is typically fixed for the duration of the flow. Thus, it will not be influenced by parameters such as current load conditions of the network, as indicated by, e.g., lost packets or ICMP messages. Although occasionally losing some packets does not render the flow useless, the loss of more than 1% of the data usually deteriorates the quality of the flow to an unacceptable level. Thus, curtailing such a flow by dropping a certain percentage of the packets renders the whole flow useless. Therefore, such a flow must either be given the full bandwidth it requires or be completely dropped. The bandwidth such a flow needs can be easily detected either by transparently examining the messages exchanged between the endpoints of the flow during connection setup time or by just observing the traffic patterns.

As the average transmission speed of all clients in the wireless network and the average actual back-off are known, the NUC for that flow can be accurately estimated. It should be noted that while the number of frames and the size of the transmitted frames remains constant during the lifetime of the flow, the NUC of such a flow can change significantly due to variations in the transmission data rate, especially in the case of mobile clients, as discussed further below.

Data flows, on the other hand, use connection-oriented transport layer protocols, such as TCP. In most cases, such protocols also provide flow control and congestion control. Apart from resending lost data, flow control and congestion control adapt the network usage of the connection due to current conditions, such as available buffer size on the receiving side or network congestion. In other words, the bandwidth used by such a flow, as well as the NUC of the flow, can change over time. While the user may notice a smaller bandwidth, e.g., by a longer transmission time for a file or web page, a reduction in bandwidth does not render the flow useless. Therefore, such flows can be throttled down, for example, by means of TCP congestion control. The use of TCP congestion control and other mechanisms to curtail the bandwidth of such a flow is described in S. Garg et al., "Wireless Access Server for Quality of Service and Location Based Access Control in 802.11 Networks," Proc. of the Seventh IEEE Symposium on Computers and Communication (ISCC'02), Taormina, Italy, 2002, incorporated by reference above. As opposed to VoIP flows, the bandwidth of a data flow cannot be assessed from the values collected when the flow is detected. In the following discussion, it is assumed that no information about the NUC of the flow is available.

Network Utilization Characteristic

As previously indicated, the disclosed "network utilization characteristic" provides an accurate assessment of the available resources in the wireless network. It has been observed that bandwidth is an inappropriate criterion for measuring network utilization of wireless networks. In an 802.11b wireless infrastructure based network with a single client, the fixed overhead per frame transmission is 765 µs when transmitting at 11 Mbps. The time it takes to transmit 100 bytes at this data rate is 72.7 µs. Consequently, the transmission of 1000 bytes takes 727 µs. Therefore, when transmitting 100 byte frames, the transmission of a single 100 byte frame including all overhead takes 837.5 µs and thus the maximum number of frames that can be transmitted per second is 1193, resulting in a maximal throughput of 954 Kbps. For 1000 bytes size per frame, a maximum of 670 frames can be transmitted per second, resulting in a maximal throughput of 5.36 Mbps.

Thus, bandwidth provides an inappropriate criterion for determining whether a new VoIP stream or data stream can be accommodated without exceeding the capacity of a wireless network. The situation becomes even more complex when multiple flows are to be considered as necessary for admission control.

According to one aspect of the present invention, a network utilization characteristic is measured on a per-flow basis to measure network capacity. The network utilization characteristic (NUC) of a flow is defined as the fraction of time per time unit needed to transmit the flow over the network. As used herein, the term "network utilization characteristic" of a flow shall also include any method of measuring the channel usage of a communication network that produces the same value for two flows that use the same fraction of time per time unit to transmit on the channel and produces the same ranking of flows with respect to their network usage as the NUC measure. For example, such measures include the reciprocal value of the NUC as defined above, the logarithm of the NUC as defined above, or the size of a flow in Mbps that uses frames with 1472 bytes of payload only that could be transmitted in the same fraction of time per time unit as the flow under consideration.

Two flows having the same network utilization characteristic are said to be bandwidth equivalent. In the exemplary embodiment described herein, considerations are based on a "per second" basis. Any other interval, such as a beacon period, can be used without any change in the results, as would be apparent to a person of ordinary skill in the art.

Consider a flow with 100 byte size frames having a bandwidth of 100 Kbps and transmission parameters as outlined above. The time (overhead and actual data transmission time) to transmit a single frame is 837 µs. The time to transmit 100 Kbps using a frame size of 100 bytes requires 125 packets per second. The time to transmit 125 packets of that size takes 104.6 ms. Thus, the NUC of the flow is 0.1046. Now consider a flow with 1000 byte size frames having a bandwidth of 1 Mbps and the transmission parameters as outlined above. The flow sends 125 frames per second and the transmission time for a single frame is 1492 µs. Hence, the NUC of the flow is 0.1865.

The sum of the NUCs of all flows (including auxiliary flows) in the network yields the fraction of time the network is busy. Consequently, the difference between one and the sum of all flows indicates the time that the medium is idle. Generally, a flow can be accommodated without sacrificing other flows if its NUC is going to be smaller than this difference value.

Measuring Network Utilization Characteristic

As discussed hereinafter, the data needed to compute (or accurately assess) the network utilization characteristic (NUC) of a flow is readily available in the access-point. Specifically, two parameters are needed for determining the NUC of a flow, namely, the number of frames sent for that flow per second and the average transmission time for a frame.

For a detailed discussion of the monitoring of packets per second, used bandwidth and average packet size per flow, see S. Garg et al., "Wireless Access Server for Quality of Service and Location Based Access Control in 802.11 Networks," Proc. of the Seventh IEEE Symposium on Computers and Communication (ISCC'02), Taormina, Italy, 2002, incorporated by reference herein. For regular Ethernet, these three parameters would be sufficient to compute the transmission time per packet. For 802.11 networks, however, the overhead due to the channel access mechanism is not captured in any of the parameters. In fact, this overhead is substantial and cannot be ignored.

As indicated above, the IEEE 802.11, 802.11a and 802.11b standards for wireless Local Area Networks, described at http://standards.ieee.org/getieee802/802.11.html, include a Collision Avoidance (CSMA/CA) medium access scheme according to the Distributed Coordination Function (DCF) that helps to explain the associated overhead. The MAC protocol is designed to prevent collisions from occurring. Furthermore, unicast frames are acknowledged by the receiving station. The acknowledgment (ACK) is sent out after the transmission has finished and a defined short inter frame spacing (SIFS) time period has elapsed. If a node wants to transmit a frame and senses that the medium is idle for a distributed coordination function inter frame spacing (DIFS) time period, the node may start transmitting. Since DIFS is longer than SIFS, a correctly received frame can always be acknowledged before the next frame is transmitted.

If a node wants to start transmitting while the medium is busy or if it wants to transmit another frame after just finishing a transmission, the node also waits for the medium to be idle for the DIFS period. Then, the node does not begin to transmit immediately but enters a contention phase for the medium. Contention is performed by choosing an integer random back-off interval from a certain interval. The random back-off interval determines the number of time slots the client defers its transmission in addition to the DIFS time.

If the medium is determined to be idle in such a "slot," the back-off timer is decreased by one. If the random back-off timer has decreased to zero, the node starts transmitting. If another node starts transmitting before this happens, the node continues to count down an amount equal to the back-off timer after the medium has been sensed idle for the DIFS period. Thus, if multiple clients want to transmit a frame, the one with the lowest random back-off time will win the contention for the medium.

Determining Transmission Time of a Frame

Transmission time of a frame consists of time to transmit the frame itself, PHY layer header overhead, overhead of an ACK and overhead imposed by the DCF mechanism. The DCF overhead consists of one SIFS, one DIFS and a back-off interval. The transmission of ACKs and data frames causes a physical layer overhead of 192 µs in each case. The duration of sending the data depends on the frame length and the transmission speed. For an ACK, the size is fixed at 14 bytes so the duration only depends on the transmission speed. In addition, the SIFS and DIFS intervals are fixed. R denotes the transmission speed in bps and b denotes the size of the data frame in bytes. Apart from frame size, the only information needed to calculate the tabulated values is the transmission speed. The time needed for transmitting the frame includes the following components:

| | |
|---|---|
| Data Frame- | 192 µs + b · 8/R |
| SIFS- | 10 µs |
| ACK- | 192 µs + 14 · 8/R |
| DIFS- | 50 µs |

The component of the transmission time not yet addressed is the back-off value. In wireless mediums, the actual number of idle back-off slots immediately preceding the transmission is of more interest than the actual back-off window that was chosen for the transmitted frame. A slot time in 802.11b is 20 µs, so the number of slots waited between the end of DIFS and the transmission multiplied by the slot time yields the desired value.

Determining the NUC of a Flow

To accurately determine the NUC of a flow, it is sufficient to compute the transmission time of all frames transmitted that belong to the flow and then sum up these values on a per-second basis. However, a simplified methodology for computing the NUC of a flow is initially presented. If the number of frames sent, n; the average number of bytes sent per data frame, b; the average transmission speed (on a per-byte basis) $R_{avg}$; and the average number of actual back-off intervals waited before transmission, s, are given, the NUC can be computed as follows:

$NUC=n \cdot (s \cdot 20 \text{ µs} + 192 \text{ µs} + (b \cdot 8)/R_{avg} + 10 \text{ µs} + 192 \text{ µs} + (14 \cdot 8)/R_{avg} + 50 \text{ µs})$.

It is noted that the NUC obtained is identical with the number that would be computed by summing up the transmission time needed for all frames of the flow.

While the number of frames sent per second and the average number of bytes sent per data frame can be obtained by standard means (such as SNMP MIBs), the transmission speed can be observed by both the receiving and the sending party. As the admission control scheme is most likely to be implemented in the access point and as all traffic in an infrastructure-based network either origins from the access point or is destined to the access point, it is feasible to get accurate information about the actual transmission speed of a particular frame and thus also of the average transmission speed of a particular flow. The transmission speed is determined by the wireless station based on factors such as frame error rates and strength of the radio signal, and is not dependent on the characteristics of a flow.

In fact, all flows emanating from a station will use the same transmission speed at a given time. Therefore, it suffices to measure this parameter on a per-station basis and use the value for all flows from that station. Moreover, instead of recording the transmission speed of every frame, it may be sufficient to compute the average transmission speed based on sampling frames in a short period such as a beacon-period.

Determining the actual back-off interval before transmission on a per-frame basis is not possible for anyone but the station transmitting the frame. An observer on the channel cannot distinguish between idle times caused on the channel because of back-off slots before a transmission versus the idle time caused because the station did not attempt to transmit at all. However, an average back-off value on a per-second basis is sufficient for computing the network utilization characteristic. Due to the fair nature of DCF, the average back-off interval experienced by any station is the same. In other words, the average back-off interval can be measured at the access point and the same value can be used for all stations. As previously indicated, it may suffice to measure the average back-off interval based on a few random samples at the access-point in a fixed duration.

As the preceding discussion shows, the values necessary to determine the NUC of a flow can be easily derived by standard means or accurately estimated even without having full access to the PHY/MAC layers of the access point 200. In fact, it is believed that there is a spectrum of possibilities for trading off between accuracy and simplicity of data collection. For example, in order to assess the aggregated NUC of all flows in the network, it is sufficient to know the number of packets sent, the bytes sent, the average transmission speed in the network and the average actual back-off. While only the computation or estimation of the NUC of flows has been addressed, it is also apparent that the data needed to compute the NUC of auxiliary flows, for instance due to collisions or erroneous transmissions, is present in the access point. For other ways of accounting for such traffic, see the section below entitled "Uses for NUCTotalMax."

Using NUCs for Admission Control

In the following discussion, the use of network utilization characteristics for admission control for VoIP traffic in wireless networks is described. As previously indicated, the network utilization characteristic of a flow is the fraction of time the network is busy transmitting data for that flow. The sum of all network utilization characteristics of all flows (including auxiliary flows) is the fraction of time the network is busy transmitting the data for all flows and is referred to herein as NUCTotal. If the medium is constantly busy transmitting data of the flows, then NUCTotal equals one. Hence, the difference between one and NUCTotal is the fraction of time the medium has been idle in the measured time interval.

The NUC of a flow can get very close to one. A network utilization characteristic of 0.993 was achieved for a single flow of UDP data constantly sending out frames to the network in a single client scenario. The difference to one is due to MAC-Level exchange of information such as beacons and other management frames which is captured in other flows.

Although it is possible to measure the NUC of Layer 2 traffic and of collisions and erroneous transmissions, these network activities can also be taken care of by defining an adjustable parameter NUCTotalMax that can range from zero to one and would typically be slightly less than one, as discussed below in the section entitled "Uses for NUCTotalMax." This parameter defines the de-facto limit of the network. By adjusting this parameter, the present invention can adapt either for unusual situations such as extremely high frame loss due to interference or it could be used to adjust the scheme in case the NUCs for flows are not accurately computed but estimated. In fact, whereas an accurate computation of the NUC of a flow is feasible, it is anticipated that most systems would trade off accuracy against other factors.

As used herein, a new flow is a flow that is new to the wireless network. A new flow need not be one that has just been established but could be an ongoing flow from or to a client that has just roamed into this cell of the wireless network. It is noted that a flow can be detected by observing the first packet from that flow. This holds for a flow that is about to be established as well as an ongoing flow that just roamed into the cell. VoIP streams can be detected before they are actually established by monitoring for traffic to initiate the call, such as packets directed to a H.323 port or packets containing SIP protocol messages. Similarly, the start of TCP flows can be detected by examining the SYN/ACK bits in the TCP packet header. Generally, a flow cannot create a significant load on the network before it is detected.

Clearly, calculating the NUCs as described above generates accurate data regarding the usage of the network in a past interval. The present invention assumes that the past NUC of a flow constitutes a good estimate of the flows future NUC. In other words, a steady state usage model is assumed for computing the permissibility of a new VoIP flow. Since the bandwidth used by a flow may change over time, it is necessary to also enforce bandwidth restrictions of non-VoIP flows in order to provide VoIP admission control.

This holds especially true if the network operates close to its capacity limits. Along the same lines, when a new data flow is detected, the NUCavailable for this flow is to be determined and enforced depending on the policies in the system. While the NUC of a flow accurately measures the network resources used by the flow, bandwidth is a variable that will probably also be considered when formulating policies for admission control. Apart from determining whether new flows should be admitted, the NUCs of all flows need to be monitored constantly.

Access Point 200

Figure 3:
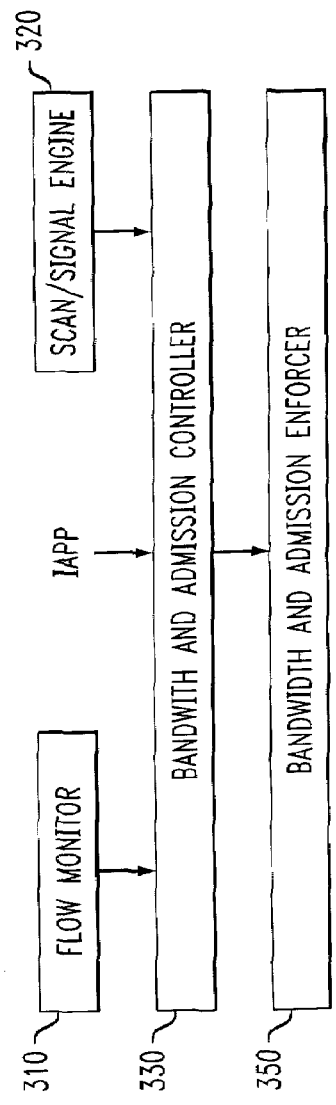
FIG. 3 is a schematic block diagram illustrating the various components of the access point of FIG. 2 that are used for admission control in accordance with the present invention.

FIG. 3 is a schematic block diagram illustrating the various components of the access point 200 that are used for admission control. Generally, the control of network utilization is a generalized form of bandwidth control. For a more detailed discussion of techniques to monitor and control the bandwidth consumed by each such flow, see, for example, U.S. patent application Ser. No. 10/178,762, filed Jun. 25, 2002, entitled "System and Method for Providing Bandwidth Management for VPNs," incorporated by reference herein. Network usage can be enforced using the same techniques as bandwidth usage. The target numbers and the measurement of actual usage are based, however, on the network utilization characteristic in accordance with the present invention.

As shown in FIG. 3, the access point 200 includes a flow monitor 310 that monitors the traffic to and from the wireless network, classifies the traffic into flows and computes the bandwidth of each flow. A scan/signal engine 320 detects traffic intended to establish a VoIP flow using various means, for instance by leveraging Resource Reservation Protocol (RSVP), discussed below, if the network is admission control enabled or by analyzing the traffic in standalone mode, as discussed further below. A new flow or intention to establish a new flow can be detected by (i) the scan/signal engine 320 before the flow is about to be established; (ii) the flow monitor 310 when the flow has been started; or (iii) by leveraging the Inter Access Point Protocol (IAPP) in case of a client roaming into a cell controlled by the access point 200 with an ongoing VoIP call.

When a new flow or an intention to establish a new flow is detected, a bandwidth admission controller 330 is engaged and the steps followed to determine whether admission control is needed are identical. However, when it is determined that admission control is needed, the manner in which such admission control is enforced by a bandwidth and admission enforcer 350 is different and varies in accordance with established network policies. The operation of the bandwidth admission controller 330 is discussed hereinafter in conjunction with FIG. 4.

Figure 4:
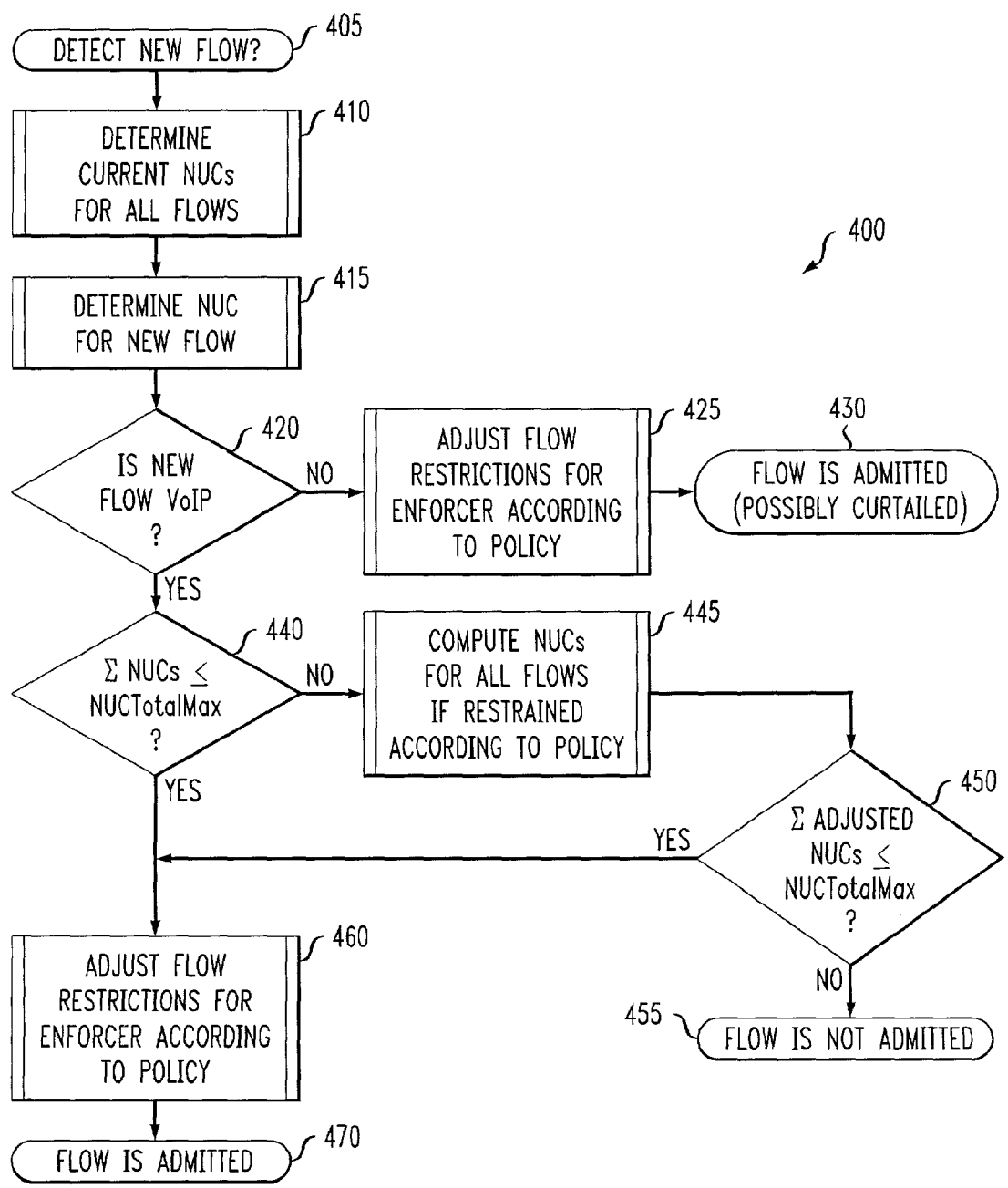
FIG. 4 is a flow chart describing an exemplary implementation of an admission control process performed by the access point of FIG. 2.

FIG. 4 is a flow chart describing an exemplary implementation of an admission control process 400. As previously indicated, the admission control process 400 the access point 200 performs the admission control process 400 that includes the following tasks: (i) classifying traffic into flows at some granularity; (ii) categorizing and measuring the network utilization characteristics of each flow; (iii) controlling the network usage of each flow to the desired value in accordance with the quality of service (QoS) requirements for all flows; and (iv) enforcing admission control based on the predicted network utilization characteristic of the new flow and the current network utilization characteristic of all flows.

As shown in FIG. 4, the admission control process 400 is initiated during step 405 when a new flow is detected. As indicated above, the access point 200 classifies incoming and outgoing traffic into flows. If possible, the access point 200 looks inside the IP packets and determines if the higher-layer protocol is TCP or UDP. In this case, the flow is typically defined by the four tuple <srcIP, dstIP, srcPort, dstPort>. Each incoming packet is examined for these four values, and based on the results, is classified as belonging to an existing flow or a new flow. TCP rate control mechanisms have been used to monitor and control the bandwidth consumed by each such flow. For a more detailed discussion of techniques to monitor and control the bandwidth consumed by each such flow, see, for example, U.S. patent application Ser. No. 10/178,762, filed Jun. 25, 2002, entitled "System and Method for Providing Bandwidth Management for VPNs," incorporated by reference herein.

Once a new flow is detected, the admission control process 400 computes the current NUCs for all existing flows during step 410 (NUCTotal), and estimates the NUC for the new flow during step 415. The access point 200 monitors the network utilization characteristics of each flow (given a particular method of flow classification), for example, by taking a fixed or sliding time window and then counting the number of packets and their size belonging to a particular flow that arrive in that time window. For each flow, the following characteristics are collected in a fixed or sliding time window: number of packets; average size of packets in bytes or bits; and average transmission speed (averaged on a per bit or byte basis). These values are used to compute the network utilization characteristics (NUC) of each flow as outlined above. Intuitively, the NUC for each flow captures the fraction of time per time unit that is necessary to transmit each flow over the wireless link. The NUC of each flow can be computed with the above values and the average random back-off value for medium access.

Generally, if NUCTotal plus the NUC for the new flow is less than NUCTotalMax (step 440), a VoIP flow will be admitted. If not, a decision whether other flows are to be curtailed for the new flow is made, based on the established policies. If so, the restrictions are calculated and enforced and the new flow is admitted. If not, the new flow is not admitted.

In the exemplary embodiment, a test is performed during step 420 to determine if the new flow is a VoIP flow or a data flow. If no other information is available, the following characteristics can be used to distinguish VoIP from non-VoIP streams with a high degree of reliability:

the transport protocol is UDP;
the bandwidth used does not vary over time;
the bandwidth used is between 20-80 Kbps; or
if there is a flow from a machine A to B, there is also a flow in the opposite direction from machine B to A. Furthermore, if the transport protocol is UDP and the real time protocol (RTP) is employed, a new flow can be classified as a VoIP flow and the specific codec that is employed may be determined.

Although this method will in most cases work reliably for flow classification, it is better to proactively detect a VoIP flow by either monitoring signaling data prior to flow establishment such as H.323 or SIP messages as discussed above.

If it is determined during step 420 that the new flow is a data flow, then program control proceeds to step 425 where the flow restrictions are adjusted according to the network policy. The flow is admitted during step 430 although it may not be allocated the full desired bandwidth. As previously indicated, a reduction in bandwidth does not render a data flow useless, although the user may notice a smaller bandwidth, e.g., by a longer transmission time for a file or web page.

If, however, it is determined during step 420 that the new flow is a VoIP flow, then program control proceeds to step 440 where a further test is performed during step 440 to determine if the sum of all NUCs for the existing and new flow(s) (NUCTotal) is less than NUCTotalMax. If it is determined during step 440 that NUCTotal is not less than NUCTotalMax, then program control proceeds to step 445 where the sum of all NUCs for the existing and new flow(s) (NUCTotal) is recomputed, if restrained according to the permitted network policy, if any.

A further test is performed during step 450 to determine if the sum of all adjusted NUCs for the existing and new flow(s) (adjusted NUCTotal) is less than NUCTotalMax. If it is determined during step 450 that the adjusted NUCTotal is not less than NUCTotalMax, then the new flow is not admitted (step 455).

If, however, it is determined during step 450 that the adjusted NUCTotal is less than NUCTotalMax or if it was determined during step 440 that the original NUCTotal is less than NUCTotalMax, then program control proceeds to step 460 where the flow restrictions are adjusted according to the network policy. The flow is admitted during step 470.

If the network 150 supports Network Admission Control, then those features are used by the access point 200 to learn about new VoIP calls and for admission control. For example, if the RSVP feature is supported, its mechanisms may be leveraged. For a more detailed discussion of the RSVP feature and admission control, see, for example, Resource Reservation Protocol (RSVP Version 1 Functional Specification), Internet Engineering Task Force (IETF) RFC 2205, 1997; or A Framework for Policy-based Admission Control, IETF RFC 2753, January 2000, each incorporated by reference herein. Standalone Admission Control by the access point 200 is used if the network does not provision admission control features. As "standalone" indicates, the access point 200 performs its operations without any additional information from other devices such as PBXs or SIP Proxies or additional information obtained through protocols, such as RSVP. The access point 200 scans all incoming and outgoing traffic for packets containing call signaling data. If call signaling information is found, the access point 200 operates as if an RSVP message indicating that a new call shall be established were received.

A special problem in wireless networks is roaming. In this case, the access point 200 that an endpoint is connected to changes during the conversation. This event occurs on Layer 2 and does not trigger any new call signaling. Therefore, if an endpoint roams from one access point 200 to another access point 200, the ongoing VoIP flow can be detected either by flow detection as described above or by leveraging the inter access point protocol (IAPP) as specified in IEEE 802.11f.

NUCTotalMax

The NUCTotalMax value, discussed above, may be used to (i) account for certain inaccuracies that might arise if data needed to determine the NUC of flows and auxiliary flows is only partially collected, or (ii) create a network capacity backup that might be needed in some situations (or both).

Loss and Collisions

There is a trade-off between the accuracy of the NUC computation and the amount of information that needs to be collected. By keeping track of the traffic and its characteristics, an access point 200 can get a totally accurate picture of the NUCs of flows and auxiliary flows in the wireless network. For example, only one out of ten packets may be used to calculate these values and the NUCs are estimated based on these samples. The resulting inaccuracies can be mitigated by employing a value referred to as NUCTotalMax. In one embodiment, such collisions are accounted without actually measuring them by adjusting the value of NUCTotalMax.

Due to the nature of the MAC protocol, two stations can attempt to transmit a frame at the same time resulting in a collision. As the data involved in a collision is rendered useless, the NUC of collisions must be accounted for, i.e., the fraction of time per time unit wasted by collisions. It is estimated that if 10 stations simultaneously transmit (a very unlikely scenario), the resulting collisions would waste about 15% of the network capacity. Thus, an exemplary embodiment adjusts the value of NUCTotalMax from 1 to 0.85. With reasonable safety it may be assumed that actual collisions will not exceed the adjusted value of NUCTotalMax and thus that if NUCTotal is less than NUCTotalMax all flows can be transmitted without loss or curtailment due to exceeding the network capacity.

While this approach is elegant and simple, in most cases the NUC wasted by collisions will be less than 15% and hence some capacity of the network would be wasted. Therefore, a more accurate estimation of the collisions would be beneficial. Extensive simulation studies have shown that the number of collisions is a function of the number of clients associated with an access point 200 and their traffic characteristics. Hence, those values could be tabulated and the NUC of the "wasted" channel capacity can be more accurately estimated by looking up those values.

Backup Capacity

While the previous section considered inaccuracies that were deliberately placed into the system by simplifying some part of the data collection process, other inaccuracies result from the bandwidth usage of real-time flows that cannot be eliminated by more detailed data collection. As indicated above, while data flows may be curtailed and still be useful, VoIP flows need to be given the full required resources. In addition, while the bandwidth of a VoIP flow typically remains fixed during the lifetime of a connection, the NUC of the same connection may change for various reasons.

For example, the VoIP endpoint in the wireless network may be mobile and roam away from the access point such that the signal strength fades and the transmission speed of the data is decreased from 11 Mbps to 1 Mbps. In one implementation, transmitting a 314 byte frame (a characteristic size for a VoIP frame) in a single sender scenario takes 993 µs at 11 Mbps and 3379 µs at 1 Mbps. Consequently, the NUC of such a stream increases by a factor of approximately 3.4.

In a network used primarily for data connections, the increase in the NUC of a VoIP flow can be accommodated by further curtailing the NUC of data connections. In a network used primarily for VoIP connections, however, the flow of a VoIP connection cannot be curtailed. Thus, there is a need to have some reserve network capacity to accommodate a change in transmission speed for some of the connections. Since it is unlikely that all of the stations will roam out of range at the same time, this reserve would probably be large enough if it consisted of sufficient NUCs for one or two slow bandwidth connections. However, whether such reserves need to be present at all is a policy question.

In one exemplary implementation, the NUC values were computed on a per-station basis (i.e., all traffic coming from a particular station of the wireless network is accumulated in a single flow). The system calculates the NUC by leveraging the per-station traffic information as provided by the driver. Apart from this information, the average random back-off value and the average number of collisions were estimated based on the number of active stations in the wireless cell.

Computing the NUC in Special Scenarios

The present invention could be employed in implementations of the forthcoming IEEE 802.11e standard for QoS in 802.11. The methods applied here also work in different scenarios such as fragmentation.

RTS/CTS

Apart from the standard DCF scheme in the IEEE 802.11 standard, the IEEE 802.11 standard also provides a Ready to Send/Clear to Send (RTS/CTS) extension that is particularly useful in wireless networks that might suffer from the hidden station problem. As the standard specifies, the use of the RTS/CTS mechanism is specified on a per-station basis and each station can be configured to use RTS/CTS either always, never or only on frames longer than a specified length. Hence, if the policy of the sending station and the length of the transmitted frame is known, it can be determined whether RTS/CTS is used even without observing the transmission. The policy of each station in the network can either be obtained by observing its behavior or by querying it from the station. On a per-flow basis, the use of RTS/CTS can be estimated by the average size of frames belonging to the flow and the variation of it.

The overhead added by RTS/CTS consists of two additional SIFSs and the overhead to transmit a 20 byte RTS frame and a 14 byte CTS frame. Similar to the values discussed above, the transmission time for RTS and CTS amount to 129 µs+(20·8)/R and 129 µs+(14·8)/R, respectively, and are thus depending on the transmission rate.

In contrast to Ethernet, fragmentation in wireless networks is in most cases not the result of a lower maximal frame size of the wireless link (the maximal frame size in 802.11 networks is far higher than in wired Ethernet) but in most cases done deliberately for improving interference stability of the wireless network. The use of fragmentation results in an overhead that is very similar to the one for RTS/CTS.

IEEE 802.11e

The forthcoming IEEE 802.11e standard will provide a new MAC scheme, referred to as the Hybrid Coordination Function (HCF), that will combine a centralized polling scheme with a QoS-enhanced version of DCF, referred to as enhanced DCF (EDCF). It is believed that the present invention can be employed in networks conforming to the IEEE 802.11e standard. It is believed that the 802.11e standard will provide a feature that stations can request time-bounded transmission opportunities from the centralized poller which in most cases is identical to the access point 200. As accurately assessing the channel capacity is very important for determining whether additional traffic can be accommodated, it is believed that the techniques for assessing the channel capacity described herein would be extremely beneficial for 802.11e implementations since the standard defines how to request for such transmission opportunities but does not provide any means to determine the feasibility of such a request.

It is to be understood that the embodiments and variations shown and described herein are merely illustrative of the principles of this invention and that various modifications may be implemented by those skilled in the art without departing from the scope and spirit of the invention.

We claim:

1. A method for performing admission control in a communication network, said method comprising the step of:
   determining whether to accept a new flow based on a network utilization characteristic for said new flow, wherein said network utilization characteristic for said new flow is a fraction of time the communication network is busy transmitting data for said new flow.

2. The method of claim 1, wherein said determining step further comprises the step of determining a total network utilization characteristic for all flows.

3. The method of claim 2, wherein said determining step further comprises the step of determining whether said total network utilization chat characteristic for all flows is below an upper limit.

4. The method of claim 3, wherein said upper limit provides a tolerance for backup capacity.

5. The method of claim 3, wherein said upper limit provides a tolerance for inaccurate data.

6. The method of claim 3, further comprising the step of curtailing one or more existing flows if said total network utilization characteristic for all flows is nor below said defined upper limit.

7. The method of claim 1, further comprising the step of classifying said new flow as a voice call.

8. The method of claim 1, further comprising the step of classifying said new flow as a data call.

9. The method of claim 1, wherein said network utilization characteristic is based on a transmission time of a frame.

10. The method of claim 9, wherein said transmission time of a frame includes a time to transmit a data frame.

11. The method of claim 9, wherein said transmission time of a frame includes one or more inter-frame spacing intervals.

12. The method of claim 9, wherein said transmission time of a frame includes one or more acknowledgement intervals.

13. The method of claim 9, wherein said transmission time of a frame includes one or more back-off intervals.

14. A system for per forming admission control in a communication network, comprising:
   a memory that stores computer-readable code; and
   a processor operatively coupled to said memory, said processor configured to implement said computer-readable code, said computer-readable code configured to:
   determine whether to accept a new flow based on a network utilization characteristic for said new flow, wherein said network utilization characteristic for said new flow is a fraction of time the communication network is busy transmitting data for said new flow.

15. The system of claim 14, wherein said processor is further configured to determine a total network utilization characteristic for all flows.

16. The system of claim 15, wherein said processor is further configured to determine whether said total network utilization characteristic for all flows is below an upper limit.

17. The system of claim 16, wherein said upper limit provides a tolerance fox backup capacity.

18. The system of claim 16, wherein said upper limit provides a tolerance for inaccurate data.

19. The system of claim 16, wherein said processor is further configured to curtail one or more existing flows if said total network utilization characteristic for all flows is not below said defined upper limit.

20. An article of manufacture for performing admission control in a communication network, comprising:
   a computer readable medium having computer readable code means embodied thereon, said computer readable program code means comprising:
   a step to determine whether to accept a new flow based on a network utilization characteristic for said new flow, wherein said network utilization characteristic for said new flow is a fraction of time the communication network is busy transmitting data for said new flow.

* * * * *

UNITED STATES PATENT AND TRADEMARK OFFICE
CERTIFICATE OF CORRECTION

| | | |
|---|---|---|
| PATENT NO. | : 7,286,474 B2 | Page 1 of 1 |
| APPLICATION NO. | : 10/261243 | |
| DATED | : October 23, 2007 | |
| INVENTOR(S) | : Garg et al. | |

It is certified that error appears in the above-identified patent and that said Letters Patent is hereby corrected as shown below:

In Column 16 line 17, "per forming" should be corrected to read --performing--.

In Column 16 lines 27-28, the words "is a fraction of time the communication network is busy transmitting data for said new flow" should be deleted and replaced with --, wherein said network utilization characteristic for said new flow is a fraction of the time the communication network is busy transmitting data for said new flow-- as per Amendment and Response to Office Action received March 28, 2007.

In Column 16 line 36, the typographical error "fox" should be corrected to read --for--

Signed and Sealed this

Eleventh Day of March, 2008

JON W. DUDAS
*Director of the United States Patent and Trademark Office*